US008871892B2

(12) United States Patent
Marks

(10) Patent No.: US 8,871,892 B2
(45) Date of Patent: Oct. 28, 2014

(54) POLYOXAZOLIDONE RESINS

(75) Inventor: Maurice J. Marks, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 136 days.

(21) Appl. No.: 13/498,709

(22) PCT Filed: Oct. 15, 2010

(86) PCT No.: PCT/US2010/052767
§ 371 (c)(1),
(2), (4) Date: Mar. 28, 2012

(87) PCT Pub. No.: WO2011/059633
PCT Pub. Date: May 19, 2011

(65) Prior Publication Data
US 2012/0214958 A1  Aug. 23, 2012

Related U.S. Application Data

(60) Provisional application No. 61/260,667, filed on Nov. 12, 2009.

(51) Int. Cl.
*C08G 59/02* (2006.01)
*C08G 59/26* (2006.01)
*C08G 59/28* (2006.01)
*C08G 18/00* (2006.01)

(52) U.S. Cl.
CPC ............. *C08G 59/02* (2013.01); *C08G 59/28* (2013.01); *C08G 18/003* (2013.01); *C08G 59/26* (2013.01)
USPC .............................. 528/73; 528/418; 528/421

(58) Field of Classification Search
None
See application file for complete search history.

(56) References Cited

U.S. PATENT DOCUMENTS

| | | | |
|---|---|---|---|
| 3,018,262 A | 1/1962 | Schroeder | |
| 3,242,108 A | 3/1966 | McGary et al. | |
| 3,313,747 A | 4/1967 | Schramm | |
| 3,334,110 A * | 8/1967 | Schramm | 548/231 |
| 3,737,406 A | 6/1973 | D'Alelio | |
| 4,066,628 A | 1/1978 | Ashida et al. | |
| 4,658,007 A * | 4/1987 | Marks et al. | 528/55 |
| 4,742,146 A | 5/1988 | Hefner | |
| 4,925,901 A | 5/1990 | Bertram et al. | |
| 5,112,932 A * | 5/1992 | Koenig et al. | 528/51 |
| 5,405,688 A | 4/1995 | Decker | |
| 6,153,719 A | 11/2000 | Abbey | |
| 6,242,803 B1 | 6/2001 | Khandros | |
| 6,432,541 B1 * | 8/2002 | Gan | 428/416 |
| 6,572,971 B2 | 6/2003 | Martin | |
| 6,632,893 B2 | 10/2003 | Konarski | |
| 6,887,574 B2 | 5/2005 | Dean | |
| 7,037,958 B1 | 5/2006 | Hansen | |
| 7,163,973 B2 | 1/2007 | Ahsan | |
| 2004/0068092 A1 | 4/2004 | Yamoto et al. | |
| 2005/0171237 A1 | 8/2005 | Patel et al. | |
| 2006/0293172 A1 | 12/2006 | Rubinsztajn et al. | |
| 2007/0221890 A1 | 9/2007 | Gan | |

FOREIGN PATENT DOCUMENTS

| | | | | |
|---|---|---|---|---|
| EP | 0113575 | 7/1984 | | |
| WO | 2006052727 | 5/2006 | | |
| WO | WO 2009058715 A2 * | 5/2009 | | G08G 18/58 |

OTHER PUBLICATIONS

Braun et al., Poly-2-oxazolidinone aus Isocyanaten and Epoxiden, Die Angewandte Makromelekulare Chemie, 1978, 1-19, 78.
Braun et al., Umsetzung von Epoxiden mit Isocyanaten, II Darstellung and Charakterisierung von 2-Oxazolidinonen, Liebigs Annalen der Chemie, 1979, 200-209, 26 (2).
Lee et al., Handbook of Epoxy Resins, McGraw Hill Company, New York, 1967, Ch. 2.

* cited by examiner

*Primary Examiner* — Mark Kaucher
*Assistant Examiner* — Kregg Brooks

(57) ABSTRACT

An epoxy oxazolidone including the reaction product of (a) a divinylarene dioxide, and (b) an excess of a polyisocyanate to provide an epoxy oxazolidone composition; wherein the composition has an oxazolidone selectivity of greater than 40% relative to the total of the carbonyl compounds; a process for making the epoxy oxazolidone; and a curable epoxy resin composition including (i) the epoxy oxazolidone derived from a divinylarene dioxide such as divinylbenzene dioxide (DVBDO) and a polyisocyanate, (ii) at least one curing agent; and/or (iii) a catalyst. The cured product made from the above epoxy resin composition is thermally stable and offers improved properties such as a lower viscosity and a high heat resistance compared to known cured products prepared from known epoxy resins.

13 Claims, No Drawings

POLYOXAZOLIDONE RESINS

CROSS REFERENCE TO RELATED APPLICATIONS

This is a §371 application of PCT International Patent Application Number PCT/US2010/052767 filed Oct. 15, 2010, and claims priority from provisional application Ser. No. 61/260,667, filed Nov. 12, 2009, which is incorporated herein by reference in its entirety.

BACKGROUND OF THE INVENTION

1. Field of the Invention

The present invention relates to polyoxazolidone resins, and more specifically, to epoxy-terminated oxazolidone resins derived from divinylarene dioxides and polyisocyanates; and polymers prepared from such epoxy-terminated oxazolidone resins.

2. Description of Background and Related Art

Epoxy terminated oxazolidone resins are known in the art and are known to be useful precursors for coatings, laminates and other uses. For example, U.S. Pat. No. 5,112,932 discloses a process for making epoxy-terminated oxazolidones by reacting a conventional epoxy resin with a polyisocyanate.

U.S. Pat. No. 5,112,932 describes epoxy oxazolidone resins prepared from epoxy resins and polyisocyanates, but does not teach the use of divinylarene dioxides as precursors for epoxy oxazolidone resins.

Braun, Dietrich; Weinert, Johann; *Angewandte Makromolekulare Chemie* (1979), 78, 1-19, describe the preparation of polyoxazolidones from diepoxides and diisocyanates, but does not prepare epoxy-functional polymers.

Braun, Dietrich; Weinert, Johann; *Liebigs Annalen der Chemie* (1979), (2), 200-9, describe the preparation of mono- and bis-oxazolidones from mono- and diepoxides and monoisocyanates, but does not use polyisocyanates and does not prepare epoxy-functional polymers.

A problem encountered with the use of prior art epoxy-terminated oxazolidone resins relates to their relatively high melt viscosity relative to their glass transition temperature ($T_g$). For example, D.E.R.™ 6508 epoxy-oxazolidone resin from The Dow Chemical Company has a $T_g$ of about 45° C., which is high enough to prevent solid agglomeration or sintering, and the temperature required for its melt viscosity to equal 500 Pa-s, a melt viscosity suitable for many epoxy thermoset applications such as coatings and composites, is about 191° C. Such high processing temperatures are energy-intensive and can cause premature crosslinking in thermoset formulations.

Another problem is encountered with the use of prior art processes for the preparation of epoxy oxazolidone resins derived from divinylarene dioxides which is low selectivity to oxazolidone (e.g. less than about 40%). Side reactions can produce in addition to the desired oxazolidone substantial amounts of either isocyanurates (from isocyanate trimerization) or carbamates (from the reaction of epoxide-based alcohols and isocyanates), or both. The presence of isocyanurates increases viscosity and causes premature gelation (either during its preparation or curing). The presence of carbamates decreases the thermal stability of the derived thermoset. These side reactions commonly reduce the oxazolidone selectivity to less than about 40%.

SUMMARY OF THE INVENTION

The present invention provides epoxy-functional oxazolidone resins derived from divinylarene dioxides bearing terminal epoxide groups which are not known in the industry. These novel resins have a ratio of the temperature at which the melt viscosity is about 500 Pa-s ($T_{500}$) to the glass transition temperature ($T_g$) (both temperatures measured in ° K) of less than about 1.5 and a high oxazolidone selectivity (e.g., greater than about 40%) and which can be reacted with curing agents and/or catalysts to form an epoxy resin thermoset.

In one embodiment, the present invention provides a novel epoxy-terminated oxazolidone resin prepared from a divinylarene dioxide; and an epoxy thermoset derived therefrom. The epoxy-terminated oxazolidone resins of the present invention advantageously have a $T_{500}/T_g$ of less than about 1.5 and an oxazolidone selectivity of greater than about 40%.

Another embodiment of the present invention is directed to an epoxy oxazolidone resin comprising the reaction product of (a) a divinylarene dioxide, for example a divinylbenzene dioxide (DVBDO), and (b) a polyisocyanate, for example 4,4'-methylene bis(phenylisocyanate) (MDI), to provide an epoxy oxazolidone resin composition.

In still another embodiment the composition has a ratio of $T_{500}$ to $T_g$ of less than about 1.5; and wherein the composition contains about 40% selectivity of oxazolidone compared the total carbonyl-bearing products (including isocyanurate and carbamate side products.

The novel epoxy-functional oxazolidone resins of the present invention bear terminal epoxide groups which allow their reaction with curing agents and/or catalysts to form thermosets. The novel epoxy-functional oxazolidones of the present invention which are prepared from divinylarene dioxides advantageously provide resins having either a higher heat resistance or good heat resistance and lower viscosity. Upon crosslinking these epoxy-functional oxazolidone resins, the resulting thermosets have high heat resistance and/or good flexibility.

Another embodiment of the present invention is directed to a curable epoxy resin composition comprising (i) the above-described epoxy-functional oxazolidone resin; and (b) at least one curing agent.

Still other embodiments of the present invention are directed to a process for preparing the epoxy-functional oxazolidone resins and the curable epoxy resin compositions described above.

Another embodiment of the present invention is directed to thermosets derived from the above curable epoxy resin compositions having either a significantly reduced pre-cured formulation viscosity at a similar $T_g$ or a higher $T_g$ at a similar pre-cured formulation viscosity.

In one embodiment, the resulting curable thermoset formulation may be used in various applications, such as for example, coatings, adhesives, composites, laminates, electronics, and the like.

DETAILED DESCRIPTION OF THE INVENTION

In its broadest scope, the present invention includes an epoxy-functional oxazolidone resin comprising the reaction product of (a) a divinylarene dioxide, for example a divinylbenzene dioxide (DVBDO), and (b) a polyisocyanate, for example 4,4'-methylene bis(phenylisocyanate) (MDI), to provide an epoxy-functional oxazolidone resin. The resulting epoxy-functional oxazolidone resin may be used to form a curable epoxy resin composition or formulation. The resulting curable epoxy resin composition or formulation may include one or more optional additives well known in the art.

The epoxy oxazolidone compositions comprising the reaction product of divinylarene dioxides and polyisocyanates advantageously provide novel resins having a balance of good properties. For example, compared to epoxy oxazolidone resins of the prior art the resin can either exhibit a higher heat resistance with a similar viscosity or exhibit a good heat resistance with a lower viscosity. Curing these novel epoxy oxazolidone resins provide thermosets having either a higher heat resistance and similar pre-cured formulation viscosity or a good heat resistance and lower pre-cured formulation viscosity. The epoxy oxazolidone resins of the present invention are suitable for the preparation of thermosets used as coatings, laminates, composites, and adhesives.

In the present invention, the divinylarene dioxide such as DVBDO can be prepared by reacting a divinylarene and hydrogen peroxide to provide the divinylarene dioxide useful in epoxy resin compositions of the present invention. Such prepared divinylarene dioxide may be used to prepare the epoxy oxazolidone of the present invention.

The divinylarene dioxides useful in the present invention, particularly those derived from divinylbenzene such as for example divinylbenzene dioxide (DVBDO), are class of diepoxides which have a relatively low liquid viscosity but impart higher heat resistance and rigidity in its derived thermosets than do conventional epoxy resins. The epoxide group in divinylarene dioxides is significantly less reactive than that in conventional glycidyl ethers used to prepare prior art epoxy oxazolidone resins.

The divinylarene dioxide useful in the present invention may comprise, for example, any substituted or unsubstituted arene nucleus bearing two vinyl groups in any ring position. The arene portion of the divinylarene dioxide may consist of benzene, substituted benzenes, (substituted) ring-annulated benzenes or homologously bonded (substituted) benzenes, or mixtures thereof. The divinylbenzene portion of the divinylarene dioxide may be ortho, meta, or para isomers or any mixture thereof. Additional substituents may consist of $H_2O_2$-resistant groups including saturated alkyl, aryl, halogen, nitro, isocyanate, or RO— (where R may be a saturated alkyl or aryl). Ring-annulated benzenes may consist of naphthalene, tetrahydronaphthalene, and the like. Homologously bonded (substituted) benzenes may consist of biphenyl, diphenylether, and the like.

In one embodiment, the divinylarene dioxide used in the present invention may be produced, for example, by the process described in U.S. Patent Application Ser. No. 61/141,457, filed of even date herewith, by Marks et al., incorporated herein by reference.

The divinylarene dioxide used for preparing the composition of the present invention may be illustrated generally by general chemical Structures I-IV as follows:

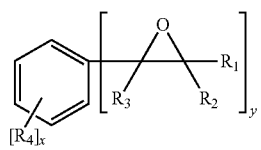

Structure I

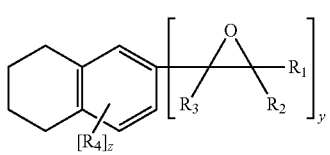

Structure II

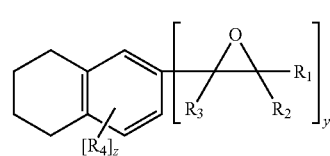

Structure III

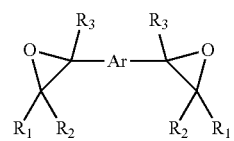

Structure IV

In the above Structures I, II, III, and IV of the divinylarene dioxide comonomer of the present invention, each $R_1$, $R_2$, $R_3$ and $R_4$ individually may be hydrogen, an alkyl, cycloalkyl, an aryl or an aralkyl group; or a $H_2O_2$-resistant group including for example a halogen, a nitro, an isocyanate, or an RO group, wherein R may be an alkyl, aryl or aralkyl; x may be an integer of 0 to 4; y may be an integer greater than or equal to 2; x+y may be an integer less than or equal to 6; z may be an integer of 0 to 6; and z+y may be an integer less than or equal to 8; and Ar is an arene fragment including for example, 1,3-phenylene group.

The divinylarene dioxide component useful in the present invention may include for example divinylbenzene dioxide, divinylnaphthalene dioxide, divinylbiphenyl dioxide, divinyldiphenylether dioxide, and mixtures thereof.

Structure V below illustrates an embodiment of a preferred chemical structure of the DVBDO useful in the present invention:

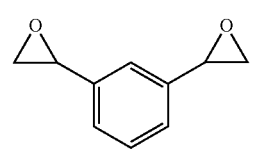

Structure V

Structure VI below illustrates another embodiment of a preferred chemical structure of the DVBDO useful in the present invention:

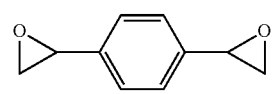

Structure VI

When DVBDO is prepared by the processes known in the art, it is possible to obtain one of three possible isomers: ortho, meta, and para. Accordingly, the present invention includes a DVBDO illustrated by any one of the above Structures individually or as a mixture thereof. Structures V and VI above show the meta (1,3-DVBDO) and para isomers of DVBDO, respectively. The ortho isomer is rare; and usually DVBDO is mostly produced generally in a range of from about 9:1 to about 1:9 ratio of meta (Structure V) to para (Structure VI) isomers. The present invention preferably includes as one embodiment a range of from about 6:1 to about 1:6 ratio of Structure V to Structure VI, and in other embodiments the ratio of Structure V to Structure VI may be from about 4:1 to about 1:4 or from about 2:1 to about 1:2.

In another embodiment of the present invention, the divinylarene dioxide may contain quantities (such as for example less than about 20 weight percent) of substituted arenes. The amount and structure of the substituted arenes depend on the process used in the preparation of the divinylarene precursor to the divinylarene dioxide. For example, divinylbenzene prepared by the dehydrogenation of diethylbenzene (DEB) may contain quantities of ethylvinylbenzene (EVB) and DEB. Upon reaction with hydrogen peroxide, EVB produces ethylvinylbenzene monoxide (EVBO) while DEB remains unchanged. The presence of these compounds can increase the epoxide equivalent weight of the divinylarene dioxide to a value greater than that of the pure compound. Therefore, in the present invention the EVBO content of the composition may be generally is less than 40 wt %, preferably less than 20 wt % and more preferably less than 10 wt %.

In one embodiment, the divinylarene dioxide, for example divinylbenzene dioxide (DVBDO), useful in the present invention comprises a low viscosity liquid epoxy resin (LER) composition. The viscosity of the divinylarene dioxide used in the process for making the epoxy resin composition of the present invention ranges generally from about 10 mPa-s to about 100 mPa-s, preferably from about 10 mPa-s to about 50 mPa-s, and more preferably from about 10 mPa-s to about 25 mPa-s at 25° C.

One of the advantageous properties of the divinylarene dioxides useful in the present invention is their thermal stability which allows their use in formulations or processing at moderate temperatures (for example, at from about 100° C. to about 200° C.) for up to several hours (for example, for at least 2 hours) without oligomerization or homopolymerization. Oligomerization or homopolymerization during formulation or processing is evident by a substantial increase in viscosity or gelling (crosslinking). The divinylarene dioxides useful in the present invention have sufficient thermal stability such that the divinylarene dioxides do not experience a substantial increase in viscosity or gelling during formulation or processing at moderate temperatures.

Another advantageous property of the divinylarene dioxide useful in the present invention may be for example its rigidity. The rigidity property of the divinylarene dioxide is measured by a calculated number of rotational degrees of freedom of the dioxide excluding side chains using the method of Bicerano described in *Prediction of Polymer Properties*, Dekker, New York, 1993. The rigidity of the divinylarene dioxide used in the present invention may range generally from about 6 to about 10, preferably from about 6 to about 9, and more preferably from about 6 to about 8 rotational degrees of freedom.

The concentration of the divinylarene dioxide used to prepare the epoxy oxazolidone resin of the present invention may range generally from a ratio r of isocyanate to epoxide equivalents of less than 1.0, preferably from about 0.99 to about 0.01, more preferably from about 0.95 to about 0.05, and most preferably from about 0.90 to about 0.10. Within the above equivalent ratios epoxide groups are always in excess and the resulting reaction product is epoxy functional.

The polyisocyanate, component (b), useful in the present invention may be any conventional polyisocyanate known in the art. For example, the polyisocyanate may include any aliphatic or aromatic polyisocyanate such as for example toluenediisocyanate, methylenediphenyldiisocyanate, hexanediisocyanate, isophoronediisocyanate, xylylenediisocyanate, and the like; and mixtures thereof.

The polyisocyanate compound useful in the practice of the present invention may be represented for example by the following general formula:

wherein R' is substituted or unsubstituted aliphatic, aromatic or heterocyclic polyvalent group and m has an average value of greater than about 1 to less than about 5, preferably from about 1.5 to about 4, most preferably from about 2 to about 3.

Examples of suitable polyisocyanates useful in the present invention include 4,4'-methylene bis(phenylisocyanate) (MDI) and isomers thereof, higher functional homologs of MDI (commonly designated as "polymeric MDI") such as ISONATE® 125M or 50 O,P' (trademark of The Dow Chemical Company) and PAPI 20, 27, 94, 901, or 580 N (available from The Dow Chemical Company); toluene diisocyanate (TDI) such as 2,4-toluene diisocyanate, 2,6-toluene diisocyanate, and VORANATE T80 (available from The Dow Chemical Company); m-xylylene diisocyanate (XDI), hexamethylene diisocyanate (HMDI) and isophoronediisocyanate (IPDI). Mixtures of any two or more polyisocyanates can also be used in the practice of the present invention. Other suitable polyisocyanate compounds useful in the present invention are described in U.S. Pat. Nos. 3,313,747; 4,066,628 and 4,742,146; all of which are incorporated herein by reference.

Preferred polyisocyanate compounds useful in the present invention are 4,4'-methylene bis(phenylisocyanate) (MDI) and isomers thereof, polymeric MDI and toluene diisocyanate (TDI); and mixtures thereof. The most preferred polyisocyanate compounds useful in the present invention are 4,4'-methylene bis(phenylisocyanate), isomers thereof and polymeric MDI; TDI, and mixtures thereof.

Other polyisocyanate compounds useful in the present invention include hydrogenated MDI and liquefied MDI-based polyisocyanates (e.g. Isonate 143L from The Dow Chemical Company). Up to about 50 wt. % monoisocyanates such as phenyl isocyanate may be included in the polyisocyanate.

The concentration of the polyisocyanate used to prepare the epoxy oxazolidone resin of the present invention may range generally from a ratio r of isocyanate to epoxide equivalents of less than 1.0, preferably from about 0.99 to about 0.01, more preferably from about 0.95 to about 0.05, and most preferably from about 0.90 to about 0.10. Within the above equivalent ratios epoxide groups are always in excess and the resulting reaction product is epoxy functional.

In preparing the epoxy oxazolidone resin of the present invention, optionally at least one reaction catalyst may be used to facilitate the reaction of the divinylarene dioxide compound with the polyisocyanate compound. The catalyst useful in the present invention may include, for example, a Lewis acid such as magnesium chloride and zirconium chloride; imidazoles, including for example 2-phenylimidazole; quaternary salts such as tetrabutylphosphonium bromide and tetraethylammonium bromide; organoantimony halides such as triphenylantimony tetraiodide and triphenylantimony dibromide; and mixtures thereof.

In one embodiment, a suitable reaction catalyst employed in the practice of the present invention may include, for example, one or more of the following: quaternary phosphonium and ammonium salts, and imidazole compounds.

In a preferred embodiment the reaction catalyst may be for example quaternary phosphonium and ammonium salts, imidazole compounds; and mixtures thereof. In another preferred embodiment, the reaction catalysts are imidazole compounds. Particularly, preferred catalysts are tetrabutylphosphonium bromide, 2-phenylimidazole, 2-methylimidazole, 1-methylimidazole, 2-ethyl-4-methylimidazole and 4,4'-methylene-bis(2-ethyl-5-methylimidazole); and mixtures thereof.

The reaction catalyst is generally employed in an amount of from about 0.01 to about 10; preferably from about 0.05 to about 5, most preferably from about 0.1 to about 2, weight percent based on the combined weight of the divinylarene dioxide compound and polyisocyanate compound used.

Also to facilitate the reaction of the divinylarene dioxide compound with the polyisocyanate compound, an optional solvent may be used in preparing the epoxy oxazolidone resin of the present invention. For example, one or more organic solvents well known in the art may be added to epoxy oxazolidone resin composition. For example, aromatics such as xylene, ketones such as methyl ether ketone, and ethers such as diglyme; and mixtures thereof, may be used in the present invention.

The concentration of the solvent used in the present invention may range generally from 0 wt % to about 90 wt %, preferably from about 0.01 wt % to about 80 wt %, more preferably from about 1 wt % to about 70 wt %, and most preferably from about 10 wt % to about 60 wt %.

The preparation of the epoxy oxazolidones of the present invention is achieved by adding to a reactor: a divinylarene dioxide, a polyisocyanate, a catalyst, and optionally a solvent; and then allowing the components to react under reaction conditions to produce the epoxy oxazolidone. The components are heated until the desired degree of reaction is achieved. The resulting product is allowed to cool prior to or during isolation and is immediately usable in thermoset formulations.

The reaction conditions to form the epoxy oxazolidones include carrying out the reaction under a temperature, generally in the range of from about 100° C. to about 250° C.; preferably, from about 125° C. to about 225° C.; and more preferably, from about 150° C. to about 200° C. The pressure of the reaction may be from about 0.1 bar to about 10 bar; preferably, from about 0.5 bar to about 5 bar; and more preferably, from about 0.9 bar to about 1.1 bar.

The reaction process to prepare epoxy oxazolidone resins of the present invention may be a batch or a continuous. The reactor used in the process may be any reactor and ancillary equipment well known to those skilled in the art.

In a preferred embodiment, the novel epoxy oxazolidone compositions of the divinylarene dioxides and polyisocyanates, have a low viscosity; wherein the viscosity is measured as a ratio of the following temperatures: $T_{500}/T_g$. The first temperature, $T_{500}$, is the temperature at which the melt viscosity of the composition is about 500 Pa-s. The second temperature, $T_g$, is the glass transition temperature of the composition. Both temperatures, $T_{500}$ and $T_g$ are measured in ° K. The ratio $T_{500}/T_g$ is generally less than about 1.5; preferably less than about 1.45; more preferably less than about 1.40; even more preferably less than about 1.35; and most preferably less than about 1.3. In another embodiment, the $T_{500}/T_g$ may comprise from about 1 to about 1.5. The thermosets derived from the novel epoxy oxazolidone compositions of the present invention exhibit a high heat resistance as compared to similar epoxy oxazolidones of the prior art.

The viscosity of the epoxy oxazolidones prepared by the process of the present invention ranges generally from about 0.1 Pa-s to about 10,000 Pa-s; preferably, from about 1 Pa-s to about 5,000 Pa-s; and more preferably, from about 1 Pa-s to about 3,000 Pa-s at 150° C.

The number average molecular weight ($M_n$) of the epoxy oxazolidones prepared by the process of the process of the present invention ranges generally from about 200 to about 100,000; preferably, from about 300 to about 10,000; and more preferably, from about 500 to about 5,000.

The epoxy oxazolidones of the present invention are useful as the epoxy component in a curable or thermosettable epoxy resin formulation or composition.

In another broad embodiment of the present invention, a curable epoxy resin composition may be prepared comprising a mixture of: (i) the above described epoxy oxazolidone; (ii) a curing agent; (iii) optionally, a catalyst; and (iv) optionally, another epoxy resin different from the epoxy oxazolidone of component (i).

The first component (i) of the curable epoxy resin composition comprises the epoxy oxazolidone, as described above.

The concentration of the epoxy oxazolidone used in the curable epoxy resin mixture of the present invention may range generally from about 100 weight percent (wt %) to about 10 wt %; preferably, from about 99 wt % to about 20 wt %; and more preferably, from about 90 wt % to about 30 wt %. Generally, the amount of epoxy oxazolidone used is at stoichiometric balance or more based on equivalents compared to that of the curing agent functional groups.

The curing agent, component (ii), useful for the curable epoxy resin composition of the present invention, may comprise any conventional curing agent known in the art for curing epoxy resins. The curing agents, (also referred to as a hardener or cross-linking agent) useful in the thermosettable composition, may be selected, for example, from those curing agents well known in the art including, but are not limited to, anhydrides, carboxylic acids, amine compounds, phenolic compounds, polyols, or mixtures thereof.

Examples of curing agents useful in the present invention may include any of the co-reactive or catalytic curing materials known to be useful for curing epoxy resin based compositions. Such co-reactive curing agents include, for example, polyamine, polyamide, polyaminoamide, dicyandiamide, polyphenol, polymeric thiol, polycarboxylic acid and anhydride, and any combination thereof or the like. Suitable catalytic curing agents include tertiary amine, quaternary ammonium halide, Lewis acids such as boron trifluoride, and any combination thereof or the like. Other specific examples of co-reactive curing agent include phenol novolacs, bisphenol-A novolacs, phenol novolac of dicyclopentadiene, cresol novolac, diaminodiphenylsulfone, styrene-maleic acid anhydride (SMA) copolymers; and any combination thereof. Among the conventional co-reactive epoxy curing agents, amines and amino or amido containing resins and phenolics are preferred.

Dicyandiamide ("dicy") may be one preferred embodiment of the curing agent useful in the present invention. Dicy has the advantage of providing delayed curing since dicy requires relatively high temperatures for activating its curing properties; and thus, dicy can be added to an epoxy resin and stored at room temperature (about 25° C.).

The amount of the curing agent used in the curable epoxy resin composition generally ranges from about 0 wt % to about 90 wt %, preferably from about 0.01 wt % to about 80 wt %, and more preferably from about 1 wt % to about 70 wt %. Generally, the amount of curing agent used is at stoichiometric balance or less based on equivalents compared to that of the epoxide groups.

The heat resistance of the epoxy oxazolidone based thermoset of the present invention ranges generally from about 50° C. to about 300° C.; preferably, from about 75° C. to about 275° C.; and more preferably, from about 100° C. to about 250° C. as measured by the glass transition temperature ($T_g$) using differential scanning calorimetry (DSC).

An assortment of additives may be optionally added to the compositions of the present invention including for example, catalysts, solvents, other resins, stabilizers, fillers, plasticizers, catalyst de-activators, and mixtures thereof.

In one embodiment, for example, a curable epoxy resin composition may comprise a reaction mixture of (i) an epoxy oxazolidone resin of a divinylarene dioxide and polyisocyanate as described above, (ii) at least one curing agent; (iii) optionally, at least one curing catalyst; and (iv) optionally, at least one other epoxy resin different from component (i).

In preparing the curable compositions of the present invention, at least one curing catalyst may also optionally be used. The catalyst used in the present invention may be adapted for polymerization, including homopolymerization, of the at least one epoxy resin. Alternatively, catalyst used in the present invention may be adapted for a reaction between the at least one epoxy resin and the at least one curing agent, if used.

The optional curing catalyst, component (iv), useful in the present invention may include catalysts well known in the art, such as for example, catalyst compounds containing amine, phosphine, heterocyclic nitrogen, ammonium, phosphonium, arsonium, sulfonium moieties, and any combination thereof. Some non-limiting examples of the catalyst of the present invention may include, for example, ethyltriphenylphosphonium; benzyltrimethylammonium chloride; heterocyclic nitrogen-containing catalysts described in U.S. Pat. No. 4,925,901, incorporated herein by reference; imidazoles; triethylamine; and any combination thereof.

The selection of the curing catalyst useful in the present invention is not limited and commonly used catalysts for epoxy systems can be used. Also, the addition of a catalyst is optional and depends on the system prepared. When the catalyst is used, preferred examples of catalyst include tertiary amines, imidazoles, organo-phosphines, and acid salts.

Most preferred curing catalysts include tertiary amines and imidazoles such as, for example, triethylamine, tripropylamine, tributylamine, 2-methylimidazole, benzyldimethylamine, 2-phenylimidazole, and mixtures thereof and the like.

The concentration of the optional catalyst used in the present invention may range generally from 0 wt % to about 20 wt %, preferably from about 0.01 wt % to about 10 wt %, more preferably from about 0.1 wt % to about 5 wt %, and most preferably from about 0.2 wt % to about 2 wt %.

In preparing the curable epoxy resin composition mixture of the present invention, in addition to the epoxy oxazolidone described above, the mixture may include at least one other epoxy resin, component (iv), different than the epoxy oxazolidone resin of component (i). Epoxy resins are those compounds containing at least one vicinal epoxy group. The epoxy resin may be saturated or unsaturated, aliphatic, cycloaliphatic, aromatic or heterocyclic and may be substituted. The epoxy resin may also be monomeric or polymeric. The epoxy resin useful in the present invention may be selected from any known epoxy resins in the art. An extensive enumeration of epoxy resins useful in the present invention is found in Lee, H. and Neville, K., "Handbook of Epoxy Resins," McGraw-Hill Book Company, New York, 1967, Chapter 2, pages 257-307; incorporated herein by reference.

The epoxy resins, used in embodiments disclosed herein for component (iv) of the present invention, may vary and include conventional and commercially available epoxy resins, which may be used alone or in combinations of two or more. In choosing epoxy resins for compositions disclosed herein, consideration should not only be given to properties of the final product, but also to viscosity and other properties that may influence the processing of the resin composition.

Particularly suitable epoxy resins known to the skilled worker are based on reaction products of polyfunctional alcohols, phenols, cycloaliphatic carboxylic acids, aromatic amines, or aminophenols with epichlorohydrin. A few non-limiting embodiments include, for example, bisphenol A diglycidyl ether, bisphenol F diglycidyl ether, resorcinol diglycidyl ether, and triglycidyl ethers of para-aminophenols. Other suitable epoxy resins known to the skilled worker include reaction products of epichlorohydrin with o-cresol and, respectively, phenol novolacs. It is also possible to use a mixture of two or more epoxy resins.

The epoxy resin useful in the present invention for the preparation of the curable epoxy resin composition, may be selected from commercially available products such as commercially available liquid epoxy resins (LER) and commercially available solid epoxy resins (SER). For example, D.E.R. 331, D.E.R. 332, D.E.R. 334, D.E.R. 580, D.E.N. 431, D.E.N. 438, D.E.R. 736, or D.E.R. 732 available from The Dow Chemical Company may be used. As an illustration of the present invention, the epoxy resin component (a) may be a liquid epoxy resin, D.E.R.® 383 (DGEBPA) having an epoxide equivalent weight of 175-185, a viscosity of 9.5 Pa-s and a density of 1.16 gms/cc. Other commercial epoxy resins that can be used for the epoxy resin component can be D.E.R. 330, D.E.R. 354, or D.E.R. 332. Other epoxy resins useful in the present invention may include SERs such as DER 661-669, preferably DER 664 commercially available from The Dow Chemical Company. Other epoxy resins useful in the present invention also may include DER 542 and other brominated epoxy resins.

Other suitable epoxy resins useful in the present invention are disclosed, for example, in U.S. Pat. Nos. 3,018,262; 7,163,973; 6,887,574; 6,632,893; 6,242,083; 7,037,958; 6,572,971; 6,153,719; and 5,405,688; PCT Publication WO 2006/052727; and U.S. Patent Application Publication Nos. 20060293172; 20050171237; and 2007/0221890 A1; each of which is hereby incorporated herein by reference.

In a preferred embodiment, the epoxy resin useful in the composition of the present invention comprises any aromatic or aliphatic glycidyl ether or glycidyl amine or a cycloaliphatic epoxy resin.

In another preferred embodiment, the epoxy resin useful in the composition of the present invention comprises a divinylarene dioxide, particularly divinylbenzene dioxide.

In general, the choice of the epoxy resin used in the present invention depends on the application. However, diglycidyl ether of bisphenol A (DGEBA) and derivatives thereof are particularly preferred. Other epoxy resins can be selected from but limited to the groups of: bisphenol F epoxy resins, novolac epoxy resins, glycidylamine-based epoxy resins, alicyclic epoxy resins, linear aliphatic epoxy resins, tetrabromobisphenol A epoxy resins, and combinations thereof.

The at least one epoxy resin, component (ii), may be present in the epoxy resin mixture composition at a concentration ranging generally from about 1 wt % to about 99 wt %, preferably from about 10 wt % to about 90 wt %, and more preferably from about 25 wt % to about 75 wt %.

In still another embodiment of the present invention, one or more optional organic solvents well known in the art may be used in the curable epoxy resin composition. For example, aromatics such as xylene, ketones such as methyl ether ketone, and alcohols such as 1-methoxy-2-propanol; and mixtures thereof, may be used in the present invention.

The concentration of the optional solvent used in the present invention may range generally from 0 wt % to about 90 wt %, preferably from about 1 wt % to about 80 wt %, more preferably from about 10 wt % to about 65 wt %, and most preferably from about 20 wt % to about 50 wt %.

The curable or thermosettable composition of the present invention may optionally contain one or more other additives which are useful for their intended uses. For example, the optional additives useful in the present invention composition may include, but not limited to, stabilizers, surfactants, flow modifiers, pigments or dyes, matting agents, degassing agents, flame retardants (e.g., inorganic flame retardants, halogenated flame retardants, and non-halogenated flame retardants such as phosphorus-containing materials), toughening agents, curing initiators, curing inhibitors, wetting agents, colorants or pigments, thermoplastics, processing aids, UV blocking compounds, fluorescent compounds, UV stabilizers, inert fillers, fibrous reinforcements, antioxidants, impact modifiers including thermoplastic particles, and mixtures thereof. The above list is intended to be exemplary and not limiting. The preferred additives for the formulation of the present invention may be optimized by the skilled artisan.

The concentration of the additional additives is generally between about 0 wt % to about 90 wt %; preferably, between about 0.01 wt % to about 80 wt %; more preferably, between about 1 wt % to about 65 wt %; and most preferably, between about 10 wt % to about 50 wt % based on the weight of the total composition.

The preparation of the curable epoxy resin composition of the present invention is achieved by admixing in a vessel the following components: the epoxy oxazolidone resin, a curing agent, optionally a catalyst, optionally another epoxy resin, and optionally an inert organic solvent; and then allowing the components to formulate into an epoxy resin composition. There is no criticality to the order of mixture, i.e., the components of the formulation or composition of the present invention may be admixed in any order to provide the thermosettable composition of the present invention. Any of the above-mentioned optional assorted formulation additives, for example fillers, may also be added to the composition during the mixing or prior to the mixing to form the composition.

All the components of the curable epoxy resin composition are typically mixed and dispersed at a temperature enabling the preparation of an effective epoxy resin composition having a low viscosity for the desired application. The temperature during the mixing of all components may be generally from about 0° C. to about 100° C. and preferably from about 20° C. to about 50° C.

The curable epoxy resin composition of the present invention, prepared from the divinylarene dioxides described above, have improved heat resistance at the same viscosity or lower viscosity at the same heat resistance compared to known compositions in the art.

The heat resistance of the epoxy oxazolidone based thermoset of the present invention ranges generally from about 50° C. to about 300° C.; preferably, from about 75° C. to about 275° C.; and more preferably, from about 100° C. to about 250° C. as measured by the glass transition temperature ($T_g$) using differential scanning calorimetry (DSC).

The curable epoxy resin formulation or composition of the present invention can be cured under conventional processing conditions to form a thermoset. The resulting thermoset displays excellent thermo-mechanical properties, such as good toughness and mechanical strength, while maintaining high thermal stability.

The process to produce the thermoset products of the present invention may be performed by gravity casting, vacuum casting, automatic pressure gelation (APG), vacuum pressure gelation (VPG), infusion, filament winding, lay up injection, transfer molding, prepreging, dipping, coating, spraying, brushing, and the like.

The curing reaction conditions include, for example, carrying out the reaction under a temperature, generally in the range of from about 0° C. to about 300° C.; preferably, from about 20° C. to about 250° C.; and more preferably, from about 50° C. to about 200° C.

The pressure of the curing reaction may be carried out, for example, at a pressure of from about 0.01 bar to about 1000 bar; preferably, from about 0.1 bar to about bar 100; and more preferably, from about 0.5 bar to about 10 bar.

The curing of the curable or thermosettable composition may be carried out, for example, for a predetermined period of time sufficient to cure the composition. For example, the curing time may be chosen between about 1 minute to about 24 hours, preferably between about 10 minutes to about 12 hours, and more preferably between about 100 minutes to about 8 hours.

The curing process of the present invention may be a batch or a continuous process. The reactor used in the process may be any reactor and ancillary equipment well known to those skilled in the art.

The cured or thermoset product prepared by curing the epoxy resin composition of the present invention advantageously exhibits an improved balance of processability and thermo-mechanical properties (e.g. pre-cured formulation viscosity, glass transition temperature, modulus, and toughness). The cured product can be visually transparent or opalescent. Compared to analogous thermosets prepared using only conventional epoxy resins, the thermosets prepared using the epoxy oxazolidone resins of the present invention have a higher $T_g$ (5-100%) and higher tensile modulus (5-100%).

The Tg will depend on the curing agent and the epoxy resin used. As one illustration, the Tg of the cured epoxy oxazolidone resins of the present invention may be from about 10% to about 100% higher than its corresponding conventional cured oxazolidone epoxy resin. Generally, the Tg of the cured epoxy oxazolidone resins of the present invention may be from about 100° C. to about 300° C.; and more preferably from about 140° C. to about 250° C.

Similarly, the tensile modulus will depend on the curing agent and the epoxy resin used. As one illustration, the tensile modulus of the cured epoxy oxazolidone resins of the present invention may be from about 10% to about 100% higher than its corresponding conventional cured oxazolidone epoxy resin. Generally, the tensile modulus of the cured epoxy oxazolidone resins of the present invention may be from about 500 MPa to about 5000 MPa; and more preferably from about 1000 MPa to about 4000 MPa.

The epoxy resin compositions of the present invention are useful for the preparation of epoxy thermosets or cured products in the form of coatings, films, adhesives, laminates, composites, electronics, and the like.

As an illustration of the present invention, in general, the epoxy resin compositions may be useful for casting, potting, encapsulation, molding, and tooling. The present invention is particularly suitable for all types of electrical casting, potting, and encapsulation applications; for molding and plastic tooling; and for the fabrication of epoxy based composites parts, particularly for producing large epoxy-based parts produced by casting, potting and encapsulation. The resulting composite material may be useful in some applications, such as electrical casting applications or electronic encapsulations, castings, moldings, potting, encapsulations, injection, resin transfer moldings, composites, coatings and the like.

EXAMPLES

The following examples and comparative examples further illustrate the present invention in detail but are not to be construed to limit the scope thereof.

In the following Examples, standard analytical equipments and methods are used such as for example, glass transition temperature ($T_g$) is measured by differential scanning calorimetry (DSC) using a temperature sweep rate of 10° C./minute; Fourier transform infrared spectroscopy (FTIR) in absorbance mode for peak heights of isocyanate (2260 $cm^{-1}$), oxazolidone (1750 $cm^{-1}$), carbamate (1725 $cm^{-1}$), and isocyanurate (1710 $cm^{-1}$); and viscosity was measured using an ARES rheometer fitted with a parallel plate fixture operating at a frequency of 10 $s^{-1}$ at the indicated temperature.

Example 1

To a 250 ml round bottom flask with thermocouple, mechanical stirrer, a heating mantle, and a heat lamp were added 45 g of DVBDO and 0.5 g of 2-phenylimidazole. The mixture was heated to 180° C. and 5.2 g of TDI was added to the mixture over 10 minutes. The reaction temperature ranged from 180-187° C. over this period. After 1 additional minute at 180° C. the reaction was complete. FTIR showed 100% isocyanate conversion and 100% oxazolidone selectivity.

Examples 2-11 and Comparative Examples A-E

A catalyst screening study was performed using 10 wt % of TDI in DVBDO with 1 wt % catalyst. About 3.5 g of TDI/DVBDO/catalyst mixtures were added into a test tube, homogenized at room temperature with stirring, and then immersed in an oil bath at 180° C. Samples were removed periodically for FTIR analysis. TDI is sensitive to side reactions (trimerization and carbamate formation). Conventional tertiary amines such as diazabicycloundecene (DBU), a catalyst which gives good oxazolidone selectivity with epoxy resins such as DER 332, gives gellation when used with DVBDO. Other catalysts including for example Group 2 and Group 4 halides, triorganoantimony halides, bismuth carboxylates, antimony halides, quaternary imonium salts, and imidazoles were effective and are described in the following Table I:

TABLE I

| Example | Catalyst | Time (min) | % Conversion NCO | % Selectivity isocyanurate | % Selectivity carbamate | % Selectivity oxazolidone |
|---|---|---|---|---|---|---|
| 2 | $MgCl_2$ | 60 | 100 | 0 | 0 | 100 |
| 3 | $ZrCl_4$ | 100 | 100 | 0 | 0 | 100 |
| 4 | $Ph_3SbBr_2$ | 10 | 100 | 0 | 0 | 100 |
| 5 | 2-phenylimidazole | 40 | 100 | 14 | 0 | 86 |
| 6 | $Bu_4PBr$ | 40 | 100 | 14 | 0 | 86 |
| 7 | $Bu_4NBr$ | 20 | 100 | 17 | 0 | 83 |
| 8 | $Bi(acetate)_3$ | 40 | 100 | 28 | 0 | 72 |
| 9 | $Ph_3SbI_2$ | 40 | 100 | 0 | 38 | 62 |
| 10 | $SbBr_3$ | 20 | 100 | 0 | 39 | 61 |
| 11 | $Sb_2O_3$ | 40 | 100 | 51 | 0 | 49 |
| Comp. Ex. A | DBU | 5 | 100 | 100 | 0 | 0 |
| Comp. Ex. B | $Cu(BF_4)_2$ | 5 | 100 | 100 | 0 | 0 |
| Comp. Ex. C | $Sb(acetate)_3$ | 5 | 81 | 0 | 100 | 0 |
| Comp. Ex. D | Sulfamic Acid | 40 | 76 | 0 | 100 | 0 |
| Comp. Ex. E | $CrCl_3$ | 110 | 100 | 0 | 100 | 0 |

The method used in Examples 2-11, where the reactants were all combined at the start of the reaction, gives lower oxazolidone selectivity than that used in Example 1, where the isocyanate was added incrementally to the reaction mixture. For instance, 2-phenylimidazole gives 100% oxazolidone selectivity in Example 1 and 86% selectivity in Example 5.

Examples 12-18 and Comparative Example F

The procedure described in Example 1 was repeated using $Bu_4PBr$ as catalyst using the amounts of reagents shown in Table II, where r is the equivalent ratio of isocyanate to epoxide groups. Comparative Example F is a sample of D.E.R.™ 6508 epoxy-oxazolidone resin from The Dow Chemical Company.

TABLE II

| Example | RNCO type | DVBDO (g) | RNCO (g) | r | Catalyst (g) | % catalyst (wt. %) | % oxazolidone (FTIR) | $T_g$ (° C.) | $T_{500}$ (° C.) | $T_{500}/T_g$ |
|---|---|---|---|---|---|---|---|---|---|---|
| 12 | TDI | 25.0 | 16.1 | 0.6 | 0.13 | 0.5 | 98 | 96 | 186 | 1.2 |
| 13 | | 25.0 | 13.4 | 0.5 | 0.13 | 0.5 | 100 | 49 | 117 | |

TABLE II-continued

| Example | RNCO type | DVBDO (g) | RNCO (g) | r | Catalyst (g) | % catalyst (wt. %) | % oxazolidone (FTIR) | $T_g$ (° C.) | $T_{500}$ (° C.) | $T_{500}/T_g$ |
|---|---|---|---|---|---|---|---|---|---|---|
| 14 |  | 25.0 | 10.8 | 0.4 | 0.13 | 0.5 | 100 | 15 | 75 | 1.2 |
| 15 |  | 25.0 | 8.1 | 0.3 | 0.13 | 0.5 | 99 | −18 | 36 | 1.2 |
| 16 | MDI | 25.0 | 23.2 | 0.6 | 0.25 | 1.0 | 98 | 98 | 196 | 1.3 |
| 17 |  | 25.0 | 19.3 | 0.5 | 0.25 | 1.0 | 99 | 57 | 109 | 1.2 |
| 18 |  | 25.0 | 15.5 | 0.4 | 0.25 | 1.0 | 100 | 20 | 77 | 1.2 |
| Comp. Ex. F (DER 6508) |  |  |  |  |  |  | 100 | 45 | 191 | 1.5 |

Examples 19-20 and Comparative Examples G-H

Epoxy oxazolidone resins are prepared as described above using the indicated epoxy resin and diisocyanate at a r=0.5 and having 100% oxazolidone selectivity and cured to complete conversion with a 3-functional phenolic novolac curing agent. $T_g$ is predicted using the method of Bicerano as described in *Prediction of Polymer Properties*, Dekker, New York, 1993.

TABLE III

| Example | Epoxy Resin | Diisocyanate | $T_g$ |
|---|---|---|---|
| Comp. Ex. G | DER 332 | MDI | 178 |
| 19 | DVBDO | MDI | 193 |
| Comp. Ex. H | DER 332 | TDI | 166 |
| 20 | DVBDO | TDI | 185 |

Examples 21-22

The procedure described in Example 1 was repeated using isophorone diisocyanate (IPDI) using the amounts of reagents shown in Table IV, where r is the equivalent ratio of isocyanate to epoxide groups. The reaction was conducted by dropwise addition of IPDI into DVBDO at 180° C. In Example 21 the catalyst and reactive time were $Ph_3SbBr_2$ and 80 min., respectively, and in Example 22 the catalyst and reaction time were $ZrCl_4$ and 195 min., respectively.

TABLE IV

| Example | RNCO type | DVBDO (g) | RNCO (g) | r | Catalyst (g) | % catalyst (wt. %) | % oxazolidone (FTIR) | $T_g$ (° C.) | $T_{500}$ (° C.) |
|---|---|---|---|---|---|---|---|---|---|
| 21 | IPDI | 15.0 | 2.0 | 0.1 | 0.07 | 0.5 | 97 | −60 | 38 |
| 22 |  | 15.0 | 4.1 | 0.2 | 0.08 | 0.5 | 92 | −26 | 130 |

What is claimed is:

1. An epoxy-functional oxazolidone resin composition comprising the reaction product of:
   (a) a divinylarene dioxide,
   (b) a polyisocyanate, and
   (c) a reaction catalyst;
   such that the reaction product formed is an epoxy-functional oxazolidone resin composition;
   wherein the reaction catalyst is selected from the group consisting of Lewis acids, imidazoles, quaternary salts, or mixtures thereof;
   wherein the epoxy-functional oxazolidone resin composition has an oxazolidone selectivity of greater than or equal to 70 percent relative to the total content of the carbonyl groups in the epoxy-functional oxazolidone resin composition;
   wherein the epoxy-functional oxazolidone resin composition has a viscosity of from about 0.1 Pa-s to about 10,000 Pa-s at 150° C.;
   wherein the epoxy-functional oxazolidone resin composition has a melt viscosity based on a ratio of $T_{500}$:Tg of less than 1.5;
   wherein $T_{500}$ is the temperature at which the melt viscosity of the epoxy-functional oxazolidone resin composition is about 500 Pa-s; and
   wherein Tg is the glass transition temperature of the epoxy-functional oxazolidone resin composition.

2. The composition of claim 1, wherein the divinylarene dioxide is selected from the group comprising one or more substituted divinylbenzene dioxide, divinylnaphthalene dioxide, divinylbiphenyl dioxide, divinyldiphenylether dioxide, and mixtures thereof.

3. The composition of claim 1, wherein the divinylarene dioxide is divinylbenzene dioxide.

4. The composition of claim 1, wherein the concentration of said divinylarene dioxide ranges from a ratio r of isocyanate to epoxide equivalents of less than 1.0; and/or wherein the concentration of said polyisocyanate ranges from a ratio r of isocyanate to epoxide equivalents of less than 1.0.

5. The composition of claim 1, wherein the polyisocyanate is selected from the group comprising toluenediisocyanate, methylenediphenyldiisocyanate, hexanediisocyanate, isophoronediisocyanate, xylylenediisocyanate; and mixtures thereof.

6. The composition of claim 1, wherein the Lewis acids include magnesium chloride or zirconium chloride; wherein the imidazoles include 2-phenylimidazole; and wherein the quaternary salts include tetrabutylphosphonium bromide or tetraethylammonium bromide.

7. A curable epoxy resin composition comprising (i) the epoxy-functional oxazolidone resin composition of claim 1; and (ii) at least one curing agent.

8. The curable composition of claim 7, wherein the concentration of the epoxy oxazolidone ranges from about 1 weight percent to about 100 weight percent; and wherein the concentration of the curing agent ranges from about 0.01 weight percent to about 90 weight percent.

9. The curable composition of claim 7, wherein the curing agent is selected from the group comprising anhydrides, carboxylic acids, amine compounds, phenolic compounds, polyols; and mixtures thereof.

10. A cured thermoset product prepared by curing the curable epoxy resin composition of claim 7.

11. A process for preparing a curable epoxy resin composition comprising admixing (i) the epoxy functional oxazolidone resin composition of claim 1; and (ii) at least one curing agent.

12. A process for preparing an epoxy functional oxazolidone resin composition comprising reacting (a) a divinylarene dioxide,
(b) a polyisocyanate; and
(c) a reaction catalyst,
such that the reaction product formed is an epoxy-functional oxazolidone resin composition;
wherein the reaction catalyst is selected from the group consisting of Lewis acids, imidazoles, quaternary salts, or mixtures thereof;
wherein the epoxy-functional oxazolidone resin composition has an oxazolidone selectivity of greater than or equal to 70 percent relative to the total content of the carbonyl groups in the epoxy-functional oxazolidone resin composition;
wherein the epoxy-functional oxazolidone resin composition has a viscosity of from about 0.1 Pa-s to about 10,000 Pa-s at 150° C.;
wherein the epoxy-functional oxazolidone resin composition has a viscosity measured as a ratio of the following temperatures: $T_{500}/Tg$ of less than 1.5;
wherein $T_{500}$ is the temperature at which the melt viscosity of the epoxy-functional oxazolidone resin composition is about 500 Pa-s; and
wherein Tg is the glass transition temperature of the epoxy-functional oxazolidone resin composition.

13. The process of claim 12, wherein the Lewis acids include magnesium chloride or zirconium chloride; wherein the imidazoles include 2-phenylimidazole; and wherein the quaternary salts include tetrabutylphosphonium bromide or tetraethylammonium bromide; or mixtures thereof.

* * * * *